United States Patent [19]

Braunstein et al.

[11] Patent Number: 4,485,306

[45] Date of Patent: Nov. 27, 1984

[54] MEASUREMENT OF SOLAR RADIATION

[76] Inventors: Arie Braunstein, 37 Shlonsky St., Tel Aviv; Ezra Sohar, 20 Sheshet Hayamim St., Jerusalem; Theodore Levite, 5 Levite St., Ramat Gan 52105, all of Israel

[21] Appl. No.: 350,163

[22] Filed: Feb. 19, 1982

[51] Int. Cl.³ .............................................. G01J 5/18
[52] U.S. Cl. ................................................... 250/372
[58] Field of Search ......................... 250/372; 340/715

[56] References Cited

U.S. PATENT DOCUMENTS

| | | | |
|---|---|---|---|
| 3,765,006 | 10/1973 | Takahashi et al. | 340/600 |
| 4,065,672 | 12/1977 | Harpster | 250/372 |
| 4,229,733 | 10/1980 | Tulenko et al. | 340/500 |
| 4,251,769 | 2/1981 | Ewert et al. | 324/96 |
| 4,279,254 | 7/1981 | Boschetti et al. | 128/395 |
| 4,348,664 | 9/1982 | Boschetti et al. | 340/600 |

*Primary Examiner*—Janice A. Howell
*Assistant Examiner*—Constantine Hannaher
*Attorney, Agent, or Firm*—Browdy and Neimark

[57] ABSTRACT

There is provided a device for indicating the level of solar radiation intensity, and especially that region of the spectrum in the ultraviolet region which causes sunburn. The device may be provided with an output subdivided into a plurality of discrete levels of intensity indicated as numerals and figures. It may be provided with means of adjustment to the physiology of the user.

6 Claims, 10 Drawing Figures

| Y | X | B | A |
|---|---|---|---|
| 0 | 0 | 0 | 0 |
| 0 | 1 | 0 | 1 |
| 1 | 1 | 1 | 0 |

UV RADIATION LEVEL

|   | Low | Medium | High |
|---|---|---|---|
| x | 0 | 1 | 1 |
| y | 0 | 0 | 1 |

MEASUREMENT OF SOLAR RADIATION

BACKGROUND OF THE INVENTION

The Ultraviolet Connection to Skin Cancer

Among the cancer-inducing stimuli of our environment is the very source upon which life itself depends, the light of the sun. The ultraviolet radiation connection began with the clinical observation of Paul Unna of Germany, who in 1894 related exposure to sunlight with chronic skin changes and skin cancer. Studies by later investigators such as H. F. Blum of the National Cancer Institute, show that this effect was not due to heat and that it could be localized to a relatively narrow band of the ultraviolet wave spectrum.

Data gathered by the National Cancer Institute shows that skin cancer is the most common form of cancer in the United States accounting for three hundred thousand new cases each year. The incidence of skin cancer is highest in the white population of the southern and western parts of the U.S., and lowest in the North, relative to the amount of sunshine in the area. This relationship is also evident in Australia. The colour of the skin is another factor. Cancer of the skin is most common among fair-complexioned people, and much less frequent among blacks than among the so-called white races.

There are on the market sun care products designed for effective screening of ultraviolet radiation. Until a decade ago, the most protective skin preparations were opaque white ointments which contained zinc oxide. When smeared on thickly enough, these ointments can effectively block out ultraviolet radiation, but they are unsightly and impractical to apply over large areas of the body.

Recent years have seen the development of some interesting new chemicals. These act not by imposing an opaque barrier between sunlight and the skin, but by selectively absorbing radiation from the "burning" wavelength of the ultraviolet spectrum. These are provided as creams and lotions that seem to disappear into the skin.

However, no electronic-type device like that of the invention is available on the market.

Moreover, the use of creams and lotions may add to the use of the novel device. The use of the abovementioned chemicals will increase the permissible time for solar exposure determined by the invention device.

SUMMARY OF THE INVENTION

The invention relates to a device for indicating the level of solar radiation, and particularly the level of radiation in the ultraviolet region. The device constitutes means for warning its users against overexposure to ultravoilet radiation and it can be used with certain tables indicative of the correct values for certain types of persons, depending on the color of the skin, complexion, etc. The invention relates to devices which give an instantaneous reading, and it also relates to devices which give integrative values. The scale can be one of numerical readout, the numerical values being indicative of the instantaneous level of radiation, or it can be one of certain levels: the readout can be divided into a plurality of stages or levels of radiation, and these can be used for determining the permissible duration of exposure to the solar radiation. For example, in the following a device will be described with a scale subdivided into three levels, but it is to be understood that this is an arbitrary subdivision and that a direct readout of the instantaneous level or subdivisions into two or more than three levels may be used.

A more sophisticated embodiment of the invention comprises a device giving an integrated value of exposure on a certain day, and if such device is integrated with an alarm watch, the alarm of same can be used to warn the user when a certain level of integral exposure to UV radiation is reached.

The basis of the device is a photovoltaic cell provided with optical filter means for measuring a predetermined part of the solar spectrum. Although the measured part may include part of the visible range, it is preferred to restrict the measurement to that part of the spectrum which is predominantly responsible for the damage to the human skin, which is in the range of about 400 nm or less. Thus, a filter having a cutoff beyond about 250 nm and 400 nm or 450 nm is suitable.

When exposed to solar radiation, the device analyzes the ultraviolet radiation levels, and the results are shown as three digits: 0,1 and 2, referring to the extent of danger on each level. An attached table reads out the permissible length of time one should remain in the sun. Instead, a change of sensitivity can be used as input according to the physiology of the user.

DESCRIPTION OF PREFERRED EMBODIMENT

The UV radiation measurements of the novel device are effected by means of a solar (photovoltaic) cell. The solar cell converts the solar energy directly into an electric current. An ultraviolet filter filters and transmits to the solar cell, the photons of the abovementioned ultraviolet wavelength spectra. The obtained proportional current is converted to a voltage amplified by a series of cascade amplifiers. A logic circuit, constructed mostly by NOR gates, receives at its input the analogue voltage (which is proportional to the radiation level). This enables analysis of the information and display of the data.

DESCRIPTION OF DRAWINGS

The invention is described with reference to the enclosed schematical drawings and diagrams, in which.

Figure 1:
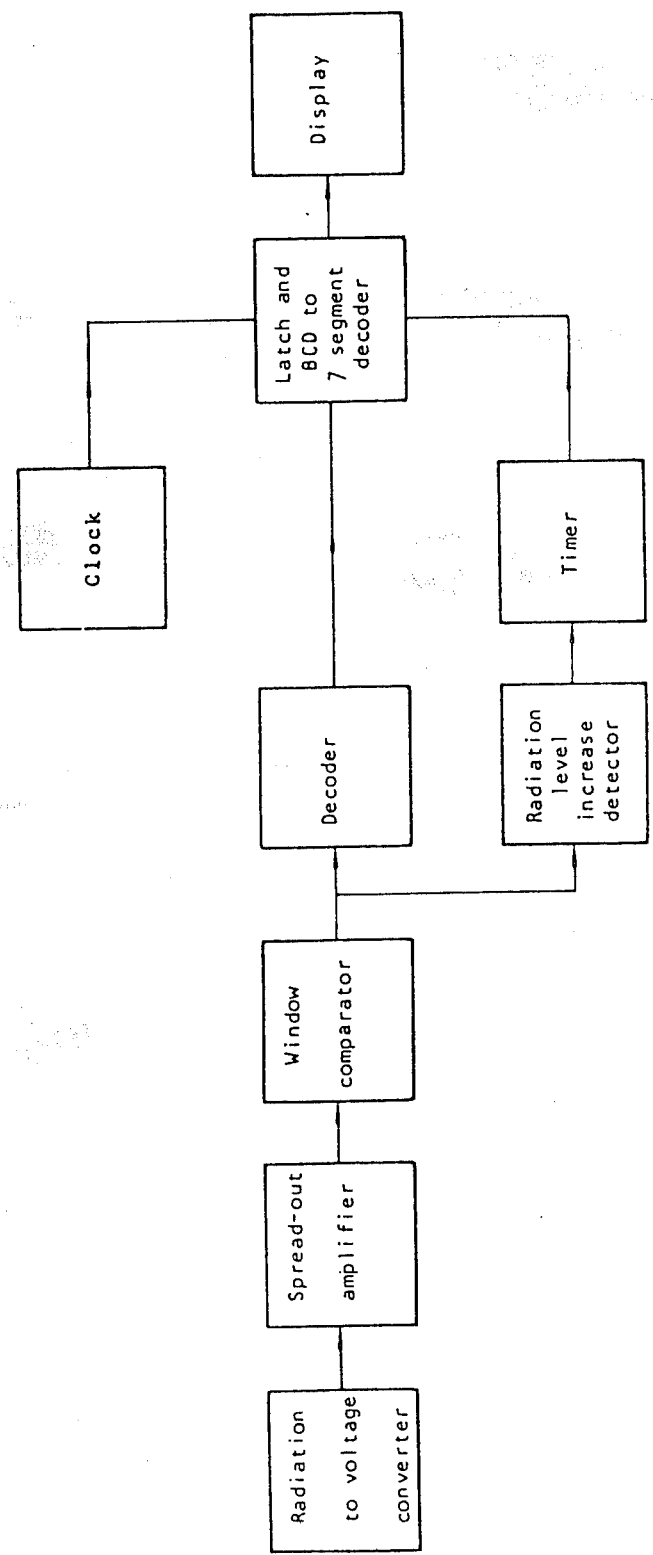
FIG. 1 is a block diagram of the device.

The principle operation of the device is illustrated by the block diagram of FIG. 1. The system includes the following circuits:

(a) Radiation to voltage converter—which converts the ultraviolet radiation level reading into a proportional voltage.

(b) Spread out amplifier—as low radiation levels mean low voltage outputs of the radiation to voltage converter, it is difficult to decide the correct radiation level. The spread out amplifier has high amplification for low voltage levels and low amplification for high voltage levels. Thus, a better operation and resolution is obtained throughout a wider spectrum.

(c) Window comparator—this comparator enables distinction between three radiation levels according to the voltages at its input. This is done by means of two comparison voltage levels, where the "window" is defined for all voltages between these two levels. The three voltage levels are shown as digits 0, 1 and 2 at the display, (d) Decoder—an analyzing circuit for the signals obtained at the output of the window comparator for a BCD type format. This type of format is required for the display.

(e) Clock—the circuit which produces the square wave required for the activation of the Liquid Crystal Display (LCD).

(f) Radiation level increase detector—a circuit which supplies the trigger for the timer, whenever an increase in the radiation levels occurs, (g) Timer—the timer is operated during 0.1 sec. In this time a sample of the incoming signal is taken. After this period of time a hold action (latch) on the binary information is performed until the timer is activated again. This can be done either by the user or by an increase of the measured radiation level.

(h) Latch and BCD to 7 segment decoder—an information holding circuit for analysis of the data and its display, (i) Display—a liquid crystal display (LCD). This type of display was chosen because of its low electric current consumption.

Figure 2:
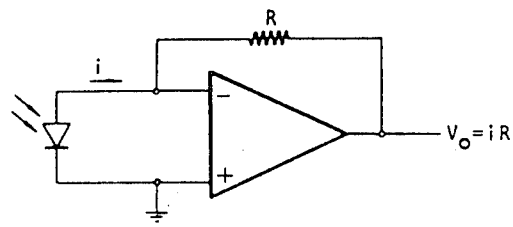
FIG. 2 illustrates the radiation to voltage converter.
Figure 3:
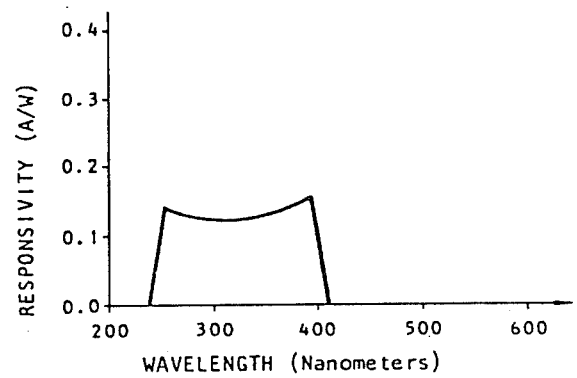
FIG. 3 is a transmission diagram of the UV filter.

TECHNICAL DESCRIPTION OF THE CIRCUITS (a) Radiation to voltage converter—the principle circuit of this converter is shown in FIG. 2. The current i, shown in FIG. 2, is proportional to the radiation level measured by the photodetector. Thus it is proportional to the output voltage, $V_o$. The detector itself is a solar (photovoltaic) cell. An ultraviolet enhanced type filter is installed in front of the solar cell. This filter transmits in the spectral range of 250 to 400 nanometers. The transmission characteristics of the filter are almost flat in the abovementioned spectral range, and tends to zero at any other wavelength, see FIG. 3.

Figure 4:
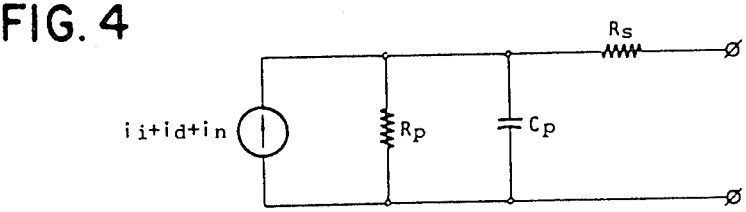
FIG. 4 is an equivalent circuit of the photodetector.

The equivalent circuit of the photodetector is shown in FIG. 4. The elements of the equivalent circuit are:

$i_l$—the light current, which is proportional to the radiation (insolation) power hitting the detector, multiplied by the multiplication factor of the detector at the same wavelength, $i_d$—the dark current, which is, in reality, equal to zero at the zero-biased condition—photovoltaic operation mode, $i_n$—the noise current, produced by the detector. This current is very low at the electronic frequencies at which the meter operates, $R_p$—the dynamic junction resistance of the photodetector. Larger values of $R_p$ yield higher thermal stability of the detector/amplifier, $C_p$—the parallel junction capacitance of the photodetector. $C_p$ influences mostly the bandwidth of the system, $R_s$—the internal series resistance of the photodetector.

The photodetector used in the device is a Silicon Detector Corporation detector type SD-200-13-13-042 or type SD-290-13-13-042. Typical values of the abovementioned parameters of the equivalent circuit are given in the photodetector data sheets.

Figure 5:
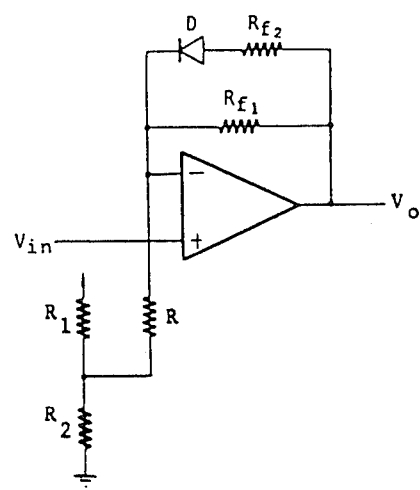
FIG. 5 illustrates a spread-out amplifier used in the device.

(b) Spread-out amplifier—the spread-out amplifier, which "spreads out" the low, and medium radiation level range, is shown in FIG. 5.

If $V_o$ denotes the voltage drop across the diode, when it does not block the current, and if:

$$V_R = \frac{V \cdot R_2}{R_1 + R_2}$$

the diode will not block the current, when:

$$V_o > V_R + V_D$$

Figure 6:
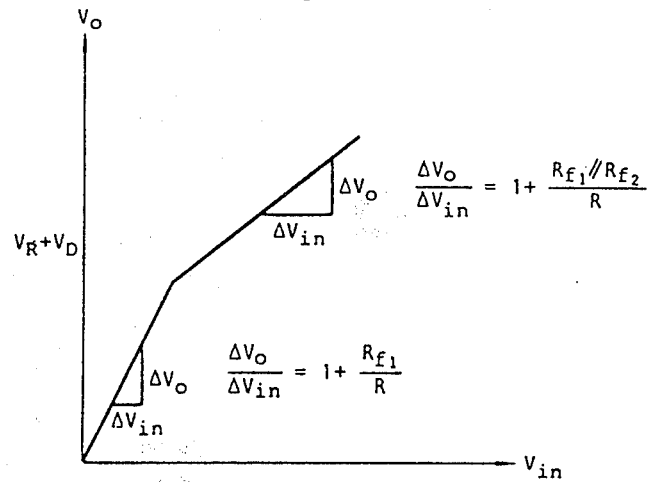
FIG. 6 illustrates the transfer function of such spread-out amplifier.

Therefore:

for $V_o < V_R + V_D$ then $A_v = 1 + \frac{R_{f1}}{R}$ for $V_o > V_R + V_D$ then $A_v = 1 + \frac{R_{f1}/R_{f2}}{R}$ The overall transfer function of the spread-out amplifier is given in FIG. 6.

Figure 7:
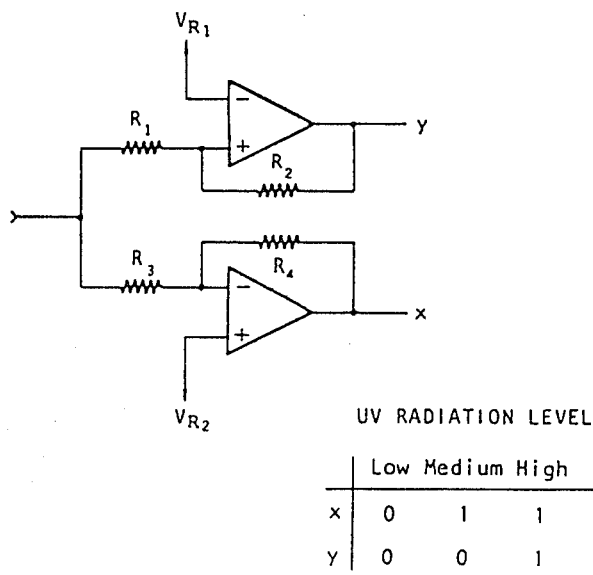
FIG. 7 illustrates the circuit of a window comparator used in the device.

(c) Window comparator—the output of the spread-out amplifier is fed into the window comparator, which is shown in FIG. 7. This comparator translates the analogue input into the logic modes shown in the table of FIG. 7.

$V_{R2}$ is the relative voltage, which relates to the low radiation (insulation) level. $V_{R1}$ is the relative voltage, which relates to the high radiation level. These two voltages are obtained by voltage dividers and can be adjusted by means of two potentiometers. By means of these potentiometers the measuring device can be calibrated.

The resistors $R_2$ and $R_4$, see FIG. 7, cause hysteresis in the circuit, thus oscillations are avoided during switching phenomena of the comparator.

Figure 8:
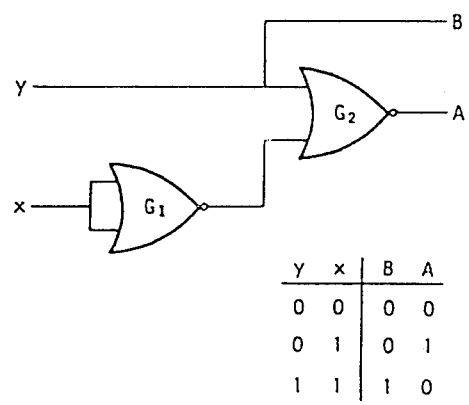
FIG. 8 illustrates the circuit of an X, Y to A, B decoder.

(d) Decoder—the levels 0,1 and 2 in the BCD code are obtained by another transfer done by means of a decoder circuit shown in FIG. 8.

Figure 9:
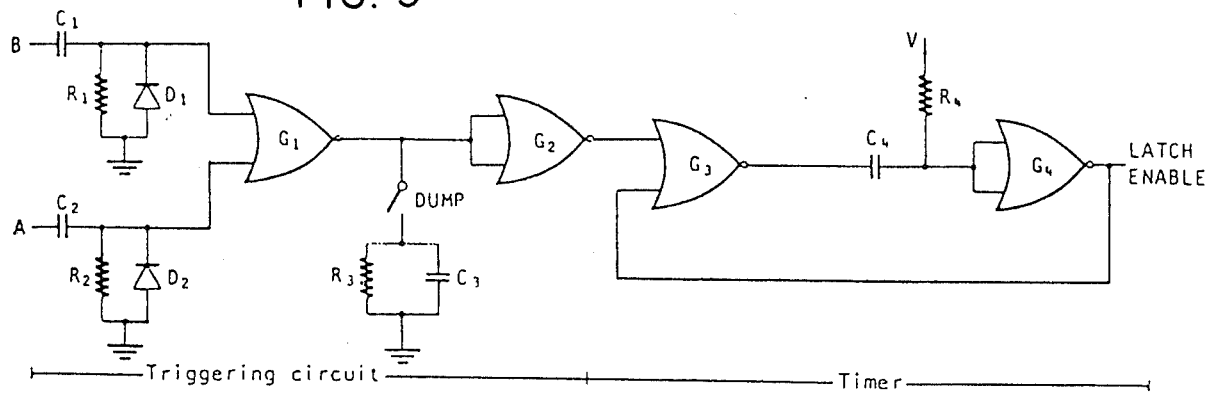
FIG. 9 illustrates timer and triggering circuits of the device.

(e) The timing circuit—the timing circuit includes a timer which enables a latch of the logic signals A and B obtained at the output of the decoder. The timer and the triggering circuits are shown in FIG. 9.

The timer operates in two cases, namely:

(a) by manual operation of the user in order to dump a former reading from the display and to enable a new reading:

(b) in case of an increase in the measured radiation level. This increase in the radiation level means a change in the logic level at the input A or B (see FIG. 9). The RC circuits at the input are used in order to obtain a differentiation at the input of the gate $G_1$. This gate will thus react in every case when the radiation level increases (which means a positive differential). The diodes $D_1$ and $D_2$ prevent the influence of a negative differential, due to a decrease of the radiation level, on the position of the abovementioned gate.

MORE GENERAL TECHNICAL DATA

The operating voltage of the device: 9 volts (The range of 3–9 volts is possible with no change in the circuits)
The current consumption (at 9 volts supply):
    Idling: 4.2 milliamperes Measuring: 6–8 milliamperes
The measured radiation spectrum: 250–400 nanometers
The responsivity of the photodetector: 0.55 A/W
Circuit technology:
   Linear amplifiers and comparators—transistorized integrated circuits (IC) with low current consumption (low power op amplifiers),
   Digital circuits—CMOS type circuits
Display: 1 digit Liquid Crystal Display (LCD)

The Circuits of the Device

Figure 10:
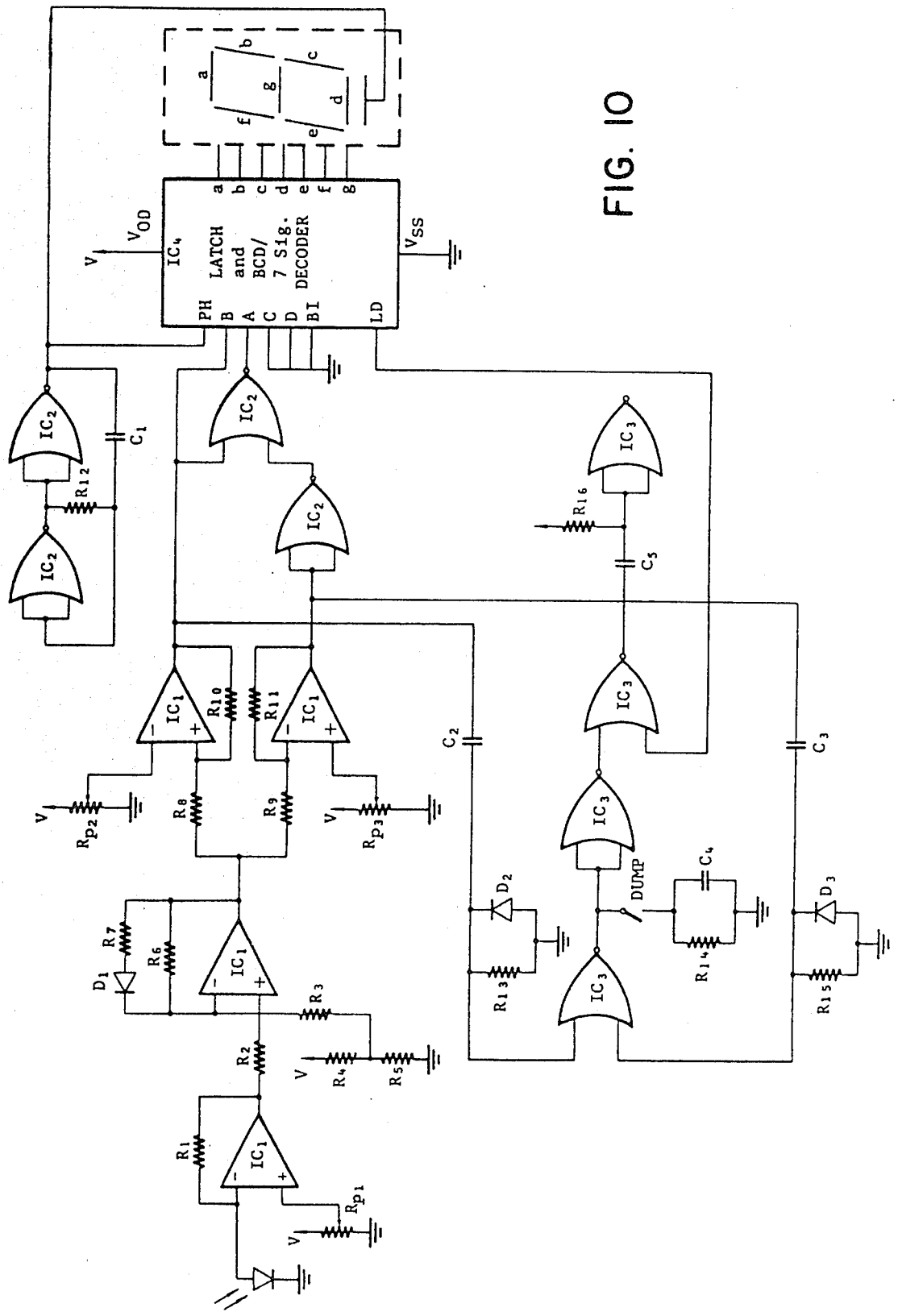
FIG. 10 illustrates the circuits of the device.

The circuits of the device are shown in FIG. 10.

| The List of Components | |
|---|---|
| $R_1 = 1\ k\Omega$ | $R_9 = 10\ k\Omega$ |
| $R_2 = 10\ k\Omega$ | $R_{10} = 180\ k\Omega$ |
| $R_3 = 5.1\ k\Omega$ | $R_{11} = 180\ k\Omega$ |
| $R_4 = 66\ k\Omega$ | $R_{12} = 180\ k\Omega$ |
| $R_5 = 33\ k\Omega$ | $R_{13} = 10\ k\Omega$ |
| $R_6 = 10\ k\Omega$ | $R_{14} = 180\ k\Omega$ |
| $R_7 = 10\ k\Omega$ | $R_{15} = 10\ k\Omega$ |
| $R_8 = 10\ k\Omega$ | $R_{16} = 180\ k\Omega$ |
| All resistors are ¼ W power | |
| $R_{p1} = 10\ k\Omega$  $R_{p2} = 10\ k\Omega$  $R_{p3} = 10\ k\Omega$ | |
| Note: all trimmers may be replaced by resistors after calibration | |
| $C_1 = 0.1\ \mu F$ | $C_4 = 0.22\ \mu F$ |
| $C_2 = 0.22\ \mu F$ | $C_5 = 4.7\ \mu F$ |
| $C_3 = 0.22\ \mu F$ | |
| $D_1$ - 1N914 | |
| $D_2$ - 1N914 | |
| $D_3$ - 1N914 | |
| $IC_1$ - LM324 | |
| $IC_2$ - CD4001 | |
| $IC_3$ - CD4001 | |
| $IC_4$ - CD4543 | |

Devices according to the present invention may be provided with means for adjusting the sensitivity, and thus the output and reading, according to the physiological type of the user of the device, blonde and nordic types being more sensitive than types with dark skin.

The device described above provides instantaneous readings. It is of course possible to provide integrating means, and thus to obtain a cumulative reading, indicating the sum of radiation (sun-light) received over a given period of time. This may be based on continuous sampling or on sampling of light intensity taken at predetermined time intervals.

The device according to the invention may be produced as such; it is also possible to integrate it into a digital type watch and to provide a separate output according to the values of sun-light intensity.

The device may be produced in any desired size. A device for individual use can be of the size of a wristwatch; there may be provided large-scale devices to be installed in public swimming pools or on the sea-shore, providing a readout of the intensity of solar radiation at any given period of time.

It is clear that the above description is by way of illustration only and that various changes and modifications of the nature and arrangement of parts may be resorted to without departing from the scope and spirit of the invention.

We claim:

1. A device for determining the intensity of solar radiation in the region of the spectrum likely to cause skin damage upon overexposure, essentially in the region of 200 to 450 nm, comprising a photosensor, a filter selectively passing the part of the spectrum in the UV region likely to cause such damage, a spread-out amplifier in combination with a window comparator, the output of said spread-out amplifier being not directly proportional to the intensity of the radiation striking said photosensor, but being spread-out by said spread-out amplifier and subdivided into a number of discrete levels by said window comparator so that the lowest level of intensity of radiation defines a range in which danger of overexposure exists only upon prolonged exposure, and to one or more higher ranges of intensity, which are amplified to lesser degrees, each level being defined by a discrete readout, and each successive readout defining a range of solar intensity higher than the preceding one.

2. A device according to claim 1, comprising means for indicating at any instant of measurement to which of said levels the intensity of radiation corresponds.

3. A device according to claim 2, wherein the readout is subdivided into 3 or 4 levels.

4. A device according to claim 1, comprising means for presetting the sensitivity and output of the device to the physiological parameters of the user.

5. A device according to claim 1, comprising a photovoltaic cell, a UV-filter in front of same, the output of which cell is amplified by said spread-out amplifier, and means for displaying the output by discrete numerical values.

6. A device according to claim 1, and means for integrating the solar radiation over a predetermined period of time and for indicating the integrated value of this radiation.

* * * * *